United States Patent [19]
Barnes et al.

[11] Patent Number: 5,831,563
[45] Date of Patent: Nov. 3, 1998

[54] IMPROVED HEIGHT ABOVE TARGET (HAT) MEASUREMENT ALGORITHM

[75] Inventors: Walter N. Barnes, Kettering; Thomas H. Gauss, Beavercreek, both of Ohio

[73] Assignee: Raytheon Company, Lexington, Mass.

[21] Appl. No.: 958,178

[22] Filed: Oct. 27, 1997

[51] Int. Cl.[6] .................................................. G01S 13/08
[52] U.S. Cl. ............................................ 342/123; 342/25
[58] Field of Search ............................ 342/123, 25, 194, 342/195, 196

[56] References Cited

U.S. PATENT DOCUMENTS 5,448,241  9/1995  Zeoli et al. ................................. 342/25

Primary Examiner—Daniel T. Pihulic
Attorney, Agent, or Firm—Leonard A.. Alkov; Glenn H. Lenzen, Jr.

[57] ABSTRACT

A method for measuring the height of an aircraft above a target. An aircraft or platform is provided with a synthetic array radar (SAR) system that is used to designate a target. The aircraft performs a constant g vertical maneuver followed by a second constant g vertical maneuver whose incremental acceleration is equal in magnitude to the first maneuver and has opposite sign. The maneuvers are out-of-plane relative to a plane containing the velocity vector of the aircraft and the target. The maneuvers correspond to a push-over maneuver followed by a pull-up maneuver. SAR map data is collected during the maneuver that includes the designated target. Quadratic phase errors contained in the collected SAR map data are measured. The height of the target relative to the ground plane of focus of the SAR system is computed using the quadratic phase errors.

4 Claims, 2 Drawing Sheets

IMPROVED HEIGHT ABOVE TARGET (HAT) MEASUREMENT ALGORITHM

BACKGROUND

The present invention relates generally to synthetic array radar (SAR) processing algorithms and methods, and more particularly, to a dual acceleration height-of-focus algorithm or method for use in measuring height of an aircraft above a target.

The current technology employed in determining the height of an aircraft relative to a target involves using single acceleration algorithms, which cannot remove the effects of centripetal acceleration error. Another related technique is employed in a GPS Aided Targeting System developed by the assignee of the present invention. The GPS Aided Targeting System requires that two separate SAR maps be formed at widely separated look angles to resolve height discrepancies.

Two other approaches that have been used to measure height of an aircraft above a target include large baseline interferometric SAR and monopulse angle measurements. Both of these techniques require second channels/apertures (not available on most SAR platforms). In addition, large baseline interferometric SAR typically requires two passes at different altitudes (usually not practical for a tactical aircraft), while monopulse height-above-target measurements are highly range dependent (being most useful below 10 nmi).

Height-of-focus measurements of aircraft height above a target are inherently susceptible to a number of errors, most of which originate in the navigation suite. All SAR imaging aircraft use data from their inertial navigation system (INS), and auxiliary inertial measurement unit (IMU) if available, to track deviations in line-of-sight (LOS) acceleration and cross-LOS velocity, and then compute phase corrections necessary to compensate for those deviations. The dominant INS/IMU errors can be attributed to cross-LOS velocity error, boresight accelerometer bias, platform tilt, and boresight accelerometer scale factor. Even under normal conditions, where the aircraft forms SAR imagery on a constant-velocity flight path, all the above error contributors can degrade the SAR imagery by introducing uncompensated phase errors.

Accordingly, it is an objective of the present invention to provide for a dual acceleration height-of-focus algorithm or method for use in measuring the height of an aircraft above a target.

SUMMARY OF THE INVENTION

To accomplish the above and other objectives, the present invention provides for an algorithm or method that significantly reduces the error associated with height-above-target measurements using height-of-focus techniques. In the method, an aircraft or platform is provided with a synthetic array radar (SAR) system that is used to designate a target. The aircraft performs a constant g vertical maneuver followed by a second constant g vertical maneuver whose incremental acceleration is equal in magnitude to the first maneuver and has opposite sign. The maneuvers are out-of-plane relative to a plane containing the velocity vector of the aircraft and the target. The two maneuvers correspond to a push-over maneuver followed by a pull-up maneuver. SAR map data is collected during the maneuver that includes the designated target. Quadratic phase errors contained in the collected SAR map data are measured. The height of the target relative to the ground plane of focus of the SAR system is computed using the quadratic phase errors.

Using conventional single acceleration height-of-focus algorithms for determining the height of the aircraft above the target, error sources with even symmetry contribute significant error to the overall height-above-target measurement. The present invention implements a dual acceleration algorithm, which causes error sources with even symmetry (such as centripetal acceleration error) to cancel, thus effectively eliminating that error source. With the effects of centripetal acceleration removed, height-above-target measurement error is greatly improved.

Optimal exploitation of SAR imagery, particularly for targeting and weapon delivery, depends heavily on the ability to accurately estimate the height of the aircraft or platform above target of the radar. One way to estimate height above target in an image is to first compute the height of focus, which is defined as the vertical scatterer displacement from the plane of focus at which its quadratic phase error reaches 90 degrees. This computed height of focus (for the given flight conditions) can then be used to normalize the various height-above-target error contributions, so they can be summed in a root-sum-square (RSS) sense to give an overall height-above-target measurement error.

To estimate the height of an aircraft or platform above a target using the present height-of-focus algorithm, a maneuver that is out-of-plane is required because that maneuver gives rise to quadratic phase error that is proportional to the height of the aircraft above the target. The "plane" of interest is a plane containing the velocity vector of the aircraft and the target.

By flying a unique, dual acceleration, vertical maneuver which has a significant component perpendicular to this "plane", line-of-sight centripetal acceleration error contributions from each half of the maneuver (which result from errors in the measurement of cross LOS velocity) cancel. The elimination of this error contributor thus improves the overall height-above-target measurement and provides a more accurate target designation. Another benefit of the present invention is that the imaging platform has an operationally desirable flight profile that begins and ends in straight and level flight. This is not the case for single acceleration algorithms.

The present invention may be used with any airborne platform that uses SAR imagery to perform targeting for weapon delivery. By improving the height-above-target measurement accuracy, weapon miss distances are significantly reduced. In addition, the present invention may be used in commercial applications for geodetic mapping, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
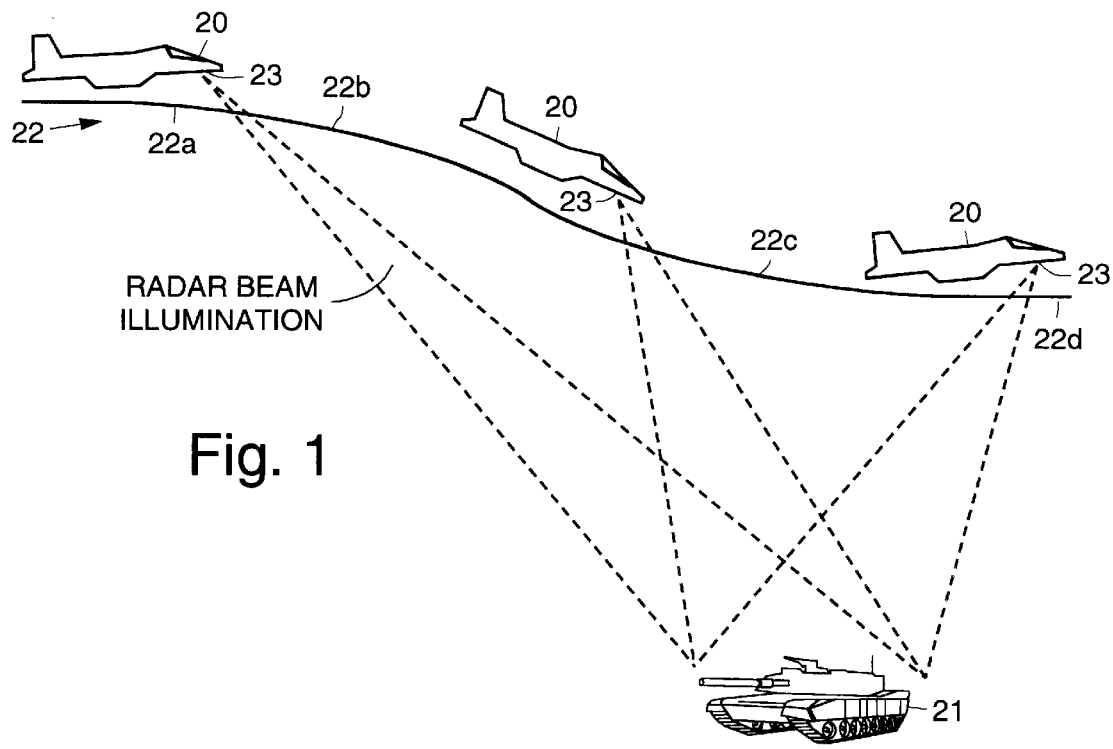
FIG. 1 is an operational scenario depicting a dual acceleration height-of-focus height-above-target measurement algorithm in accordance with the present invention.

Two approaches using height-of-focus processing to determine height-above-target measurement error are described below and were analyzed to prove out the principles of the present invention. The first approach uses a conventional single acceleration algorithm and the second approach uses the present dual acceleration algorithm with two opposing accelerations. The dual acceleration algorithm was found to provide significantly improved height-above-target measurement accuracy with aircraft maneuvers that are more suitable for operational use.

Both algorithms were exercised using nominal errors associated with a Global Positioning System (GPS) aided inertial navigation system (INS). For the dual acceleration approach, a short duration and relatively mild incremental acceleration (i.e. a four second 0.5 g incremental push over maneuver, followed immediately by a four second 0.5 g incremental pull up maneuver) was implemented. Height-above-target accuracies for the dual acceleration algorithm were calculated to be 5.54 ft at 13 nmi slant range and 11.02 ft at 37 nmi slant range. The single acceleration algorithm, using a 0.5 g incremental pull up maneuver, produced height-above-target accuracies of 14.64 ft at 13 nmi slant range and 25.32 ft at 37 nmi slant range. Thus, the dual acceleration algorithm resulted in greatly improved accuracies (over a factor of two better for each case considered).

Aircraft flight profiles used to prove out the principles of the present invention were an aircraft altitude of 30 kft at the time of target location measurement, a ground squint angle of 30 degrees, and an aircraft velocity of 844 fps. Slant ranges of 13 and 37 nmi were used as the two cases of interest.

A vertical maneuver is required to use the present height-of-focus method for determining the height-above-target measurements. It is assumed that the a target has been identified on a synthetic array radar (SAR) image prior to initiation of the height-of-focus height-above-target maneuver of the present invention and the SAR system will automatically use data collected during the maneuver on the previously designated target for the height-of-focus height-above-target measurement.

An out-of-plane acceleration introduces a quadratic phase error that is directly proportional to height of the target above the ground plane of focus (see "Height of Focus Final Technical Report", August 1983, AFWAL-TR-83-1123). The "plane" of interest is the plane containing the velocity vector of the aircraft and the target, also known as the slant plane. The present height-of-focus height-above-target method measures the quadratic phase error(s) and determines the height of the target relative to the ground plane of focus.

The accuracy of the height-above-target measurement is limited by errors in the inertial navigation system that generate quadratic phase errors. Inertial navigation SAR motion compensation errors that result in acceleration errors along the line of sight of the radar are of interest. Accelerations along the line of sight produce quadratic phase shifts. Inertial navigation errors that are taken into account are (1) the centripetal along LOS acceleration error resulting from a cross LOS velocity error, (2) an along LOS acceleration error resulting from the vertical acceleration and an inertial system level axis tilt error that results in an acceleration error in the horizontal plane, and (3) an along LOS acceleration error resulting from the vertical acceleration and an accelerometer scale factor error. In addition to the inertial navigation system errors, the error in measurement of the quadratic phase error due to signal-to-interference ratio (SIR) is taken into account.

An accelerometer bias error (on the order of 50 micro g) was also taken into account. This bias error has no effect on the dual acceleration case because error contributions cancel. Its effect on the single acceleration case is also negligible (an order of magnitude less than the other contributors), so accelerometer bias error is ignored.

Two categories of height-of-focus height-above-target measurements are discussed. One is the single acceleration approach reported in the "Height of Focus Final Technical Report". In the single acceleration case, a constant vertical g maneuver is used. The approach in accordance with the present invention is a dual acceleration maneuver, where an initial constant g vertical maneuver is followed by a second constant g vertical maneuver whose incremental acceleration is equal in magnitude to the first maneuver but with opposite sign, e.g. a push-over maneuver followed by a pull-up maneuver.

Figure 2:
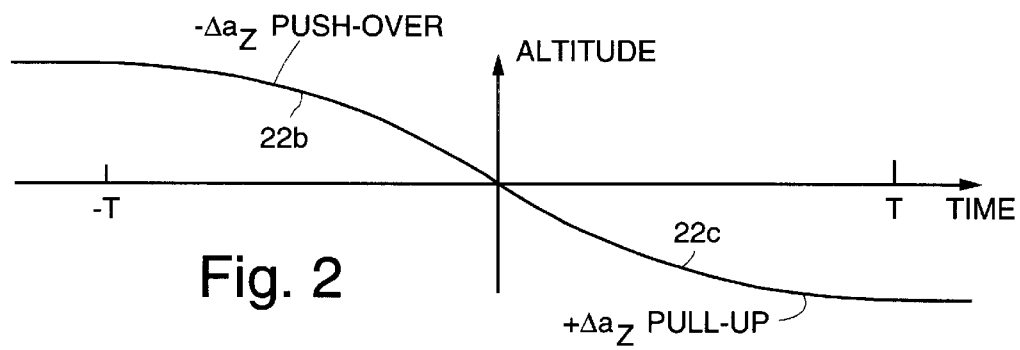
FIG. 2 illustrates a vertical S maneuver employed by an aircraft to implement the present algorithm.

Referring now to the drawing figures, FIG. 1 illustrates an operational scenario involving a dual acceleration height-of-focus height-above-target measurement method 10 or algorithm 10 in accordance with the present invention. In the present method 10 or algorithm 10, a vertical S maneuver 22 is used by an aircraft 20 relative to a target 21 to make the height-of-focus height-above-target measurement. FIG. 2 is a graph of altitude versus time corresponding to the vertical S maneuver 22 used to implement the present invention. The dual acceleration approach eliminates the error contribution due to the centripetal acceleration from the height-above-target measurement. The dual acceleration approach also has a flight profile that begins and ends in straight and level flight of the aircraft 20. This straight and level flight to straight and level flight profile is operationally desirable.

As is shown in FIG. 1, the aircraft 20 flies a vertical S maneuver 22 relative to the target 21. The aircraft 20 flies a straight and level flight path 22a and then enters the vertical S maneuver 22. The aircraft 20 flies a push-over maneuver 22b immediately followed by a pull-up maneuver 22c, and ends the maneuver flying a straight and level flight path 22d. During the vertical S maneuver 22, a synthetic array radar system 23 onboard the aircraft 20 continuously tracks the target 21 and collects data to produce a SAR map. Quadratic phase errors contained in the collected data are measured. The height of the target 21 relative to the ground plane of focus of the SAR system 23 is computed using the quadratic phase errors.

Baseline maneuvers for the two approaches are as follows. For the single acceleration case, an incremental plus 0.5 g maneuver for four seconds is used. This is a plus 1.5 g pull-up maneuver from the point of view of the aircraft. For the dual acceleration case, the vertical S maneuver 22 comprises a four second incremental minus 0.5 g vertical push-over maneuver 22b followed by a four second incremental plus 0.5 g pull-up maneuver 22c. From the point of view of the aircraft 20, this is a 0.5 g push-over maneuver followed by a 1.5 g pull-up maneuver. The vertical S maneuver 22, when entered from a level flight path 22a, ends in level flight path 22d with a loss in altitude of 250 feet.

Figure 3:
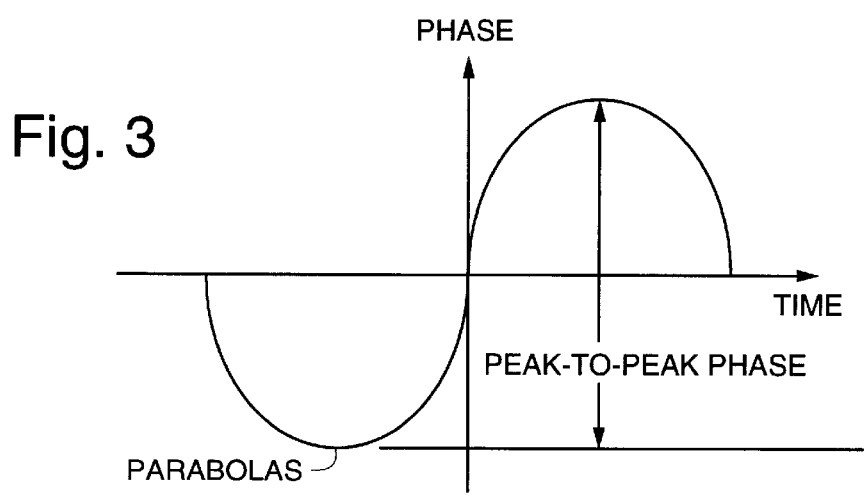
FIG. 3 illustrates a maneuver/target height induced phase history resulting from the maneuver shown in FIG. 2.

Equations were derived for height-above-target measurement errors that result from errors in the inertial platform level axis tilt, from accelerometer scale factor errors, and from errors in the cross LOS velocity. As illustrated in FIG. 3, the vertical S maneuver 22 results in a maneuver/target height induced phase history consisting of a pair of parabolic phase histories. To quantify the magnitude of the phase change, a peak to peak phase change is used.

The centripetal acceleration error caused by cross LOS velocity error does not affect the peak to peak phase measurement since it has the same sign for both the negative and positive incremental acceleration maneuver segments. These opposing accelerations cause the corresponding centripetal error contributions to cancel in the algorithm that computes the overall height-above-target measurement error.

The inertial navigation system level axis tilt error and the accelerometer scale factor error do contribute to the peak to peak phase measurement. The equation for the height-above-target measurement error that results from inertial navigation system level axis tilt is given below.

$$\sigma_{tilt2} = \left( \frac{r_0 \xi_{tilt} \cos^2\phi}{\cos\phi_{xz}} \right) \text{ feet,} \quad \text{Eq 1}$$

where $r_0$ is the slant range in feet, $\xi_{tilt}$ is the tilt error in radians, $\phi = \sin^{-1}(h_0/r_0)$ which is the depression angle along the line of sight of the radar system 23, $f\phi_{xz}$ is the angle between the slant plane and the ground plane measured in the xz plane, and $h_0$ is the altitude of the aircraft 20 in feet. Also z is the altitude axis (containing the aircraft 20 at height $h_0$ above the ground plane xy), the slant plane is the plane containing the aircraft velocity vector and the radar line of sight (a line between the radar system 23 and the target 21). Equation 1 gives the standard deviation of the height-above-target measurement error due to tilt in units of distance. The maneuver parameters of incremental acceleration and coherent integration time do not appear in the equation.

Likewise, the error contribution due to accelerometer scale factor, s, for the dual acceleration case is $$\sigma_{ASF2} = \left( \frac{r_0 s \sin\phi \cos\phi}{\cos\phi_{xz}} \right) \text{ feet,} \quad \text{Eq 2}$$

where s is the accelerometer scale factor in parts per million (ppm). As with the tilt error contribution, the standard deviation of the height-above-target measurement error due to the accelerometer scale factor also does not depend on the maneuver parameters of incremental acceleration and coherent integration time.

In addition, a limit on the accuracy for the measurement of the quadratic phase error is needed. The "Height of Focus Final Technical Report" discussed the quadratic phase error accuracy due to signal to interference ratio, SIR. For a 20 dB SIR, the standard deviation of the quadratic phase error measurement was found to be about 0.2 radians for the example target scatterer configuration. The height-above-target measurement error due to this 0.2 radian error is root sum squared with the height-above-target measurement error due to tilt error (Eq. 1), and the height-above-target measurement error due to accelerometer scale factor (Eq 2), to give a total height-above-target measurement error for the dual acceleration case, as shown in Eq. 3.

$$\sigma_{RSS2} = \left( \left( \frac{r_0 \xi_{tilt} \cos^2\phi}{\cos\phi_{xz}} \right)^2 + \left( \frac{r_0 s \cos\phi \sin\phi}{\cos\phi_{xz}} \right)^2 + \left( \frac{\sqrt{2}}{\pi} \times \left( \frac{QPE_H r_0 \lambda \cos\phi}{T^2 \Delta a_z \cos\phi_{xz}} \right) \right)^2 \right)^{1/2} \text{ feet} \quad \text{Eq 3}$$

Where $QPE_H$ is the error in measurement of quadratic phase, in radians, $\lambda$ is the radar wavelength in feet, T is the coherent integration time in seconds, and $\Delta a_z$ is the incremental vertical acceleration in feet/second$^2$.

For the case of a single incremental vertical acceleration, the target height induces a single quadratic phase error that is proportional to the height of the target 21 relative to the reference ground plane. In this approach, a quadratic phase error due to an error in the centripetal acceleration resulting from an error in the INS cross LOS velocity measurement is included. The equation for the height-above-target measurement error that results from inertial navigation system cross LOS velocity error is:

$$\sigma_{centaccl} = \frac{2v\sin\theta_s \xi_{XLOSvel} \cos\phi}{\Delta a_z \cos\phi_{xz}} \text{ feet,}$$

where v is the velocity of the aircraft 20 in feet per second, $\xi_{XLOSvel}$ is the cross LOS velocity error in feet/second, $\theta_s$ is the angle between the line of sight of the radar system 23 and the velocity vector of the aircraft 20.

This equation gives the standard deviation of the height above the target measurement error due to cross LOS velocity in units of distance. The maneuver parameter coherent integration time, T, does not appear in the equation. This height-above-target measurement error is also independent of range to the target 21.

In addition to the centripetal acceleration error contribution, the total single acceleration height-above-target measurement equation includes quadratic phase errors due to INS tilt errors, accelerometer scale factor error, and SIR, and is given in Eq 4.

$$\sigma_{RSS1} = \left( \left( \frac{2v\sin\theta_s \xi_{XLOSvel} \cos\phi}{\Delta a_z \cos\phi_{xz}} \right)^2 + \left( \frac{r_0(32.2 + \Delta a_z)\xi_{tilt}\cos^2\phi}{\Delta a_z \cos\phi_{xz}} \right)^2 + \left( \frac{r_0(32.2 + \Delta a_z)s \cos\phi\sin\phi}{\Delta a_z \cos\phi_{xz}} \right)^2 + \left( \frac{2}{\pi} \times \left( \frac{QPE_H r_0 \lambda \cos\phi}{T^2 \Delta a_2 \cos\phi_{xz}} \right) \right)^2 \right)^{1/2} \text{ feet.} \quad \text{Eq. 4}$$

Tables of results are presented below. All errors are in feet, including root-sum-square (RSS). The single acceleration algorithm (Eq 4), using an incremental acceleration of +0.5 g, was compared to the dual acceleration algorithm (Eq 3), using incremental accelerations of ±0.5 g. The comparison was made using the baseline flight profiles specified earlier (h=30 kft, squint=30 degrees off nose, T=4 s, v=844 fps), for two slant ranges of 13 and 37 nmi. The following rms errors were also assumed: cross LOS velocity error= 0.05 fps, tilt error=0.03 milliradians, accelerometer scale factor (ASF) error=100 ppm, SIR quadratic phase error=0.2 radian.

For the single +0.5 g incremental acceleration, the RSS height-above-target measurement error is:

|  | r = 13 | r = 37 |
|---|---|---|
| Centripetal Error | 3.76 | 2.76 |
| Tilt Error | 7.88 | 20.58 |
| ASF Error | 10.79 | 9.20 |
| SIR Error | 4.67 | 11.40 |
| RSS for 1 Acceleration | 14.64 | 25.32 |

For the dual ±0.5 g incremental accelerations, the RSS height-above-target measurement error is:

|  | r = 13 | r = 37 |
| --- | --- | --- |
| Centripetal Error | 0.00 | 0.00 |
| Tilt Error | 2.62 | 6.86 |
| ASF Error | 3.60 | 3.07 |
| SIR Error | 3.30 | 8.06 |
| RSS for 2 Accelerations | 5.54 | 11.02 |

As is evident from these results, the error contributors are less in all categories (and over a factor of two better for the overall RSS error) for the present dual acceleration algorithm, resulting in improved height-above-target measurement accuracy.

Figure 4:
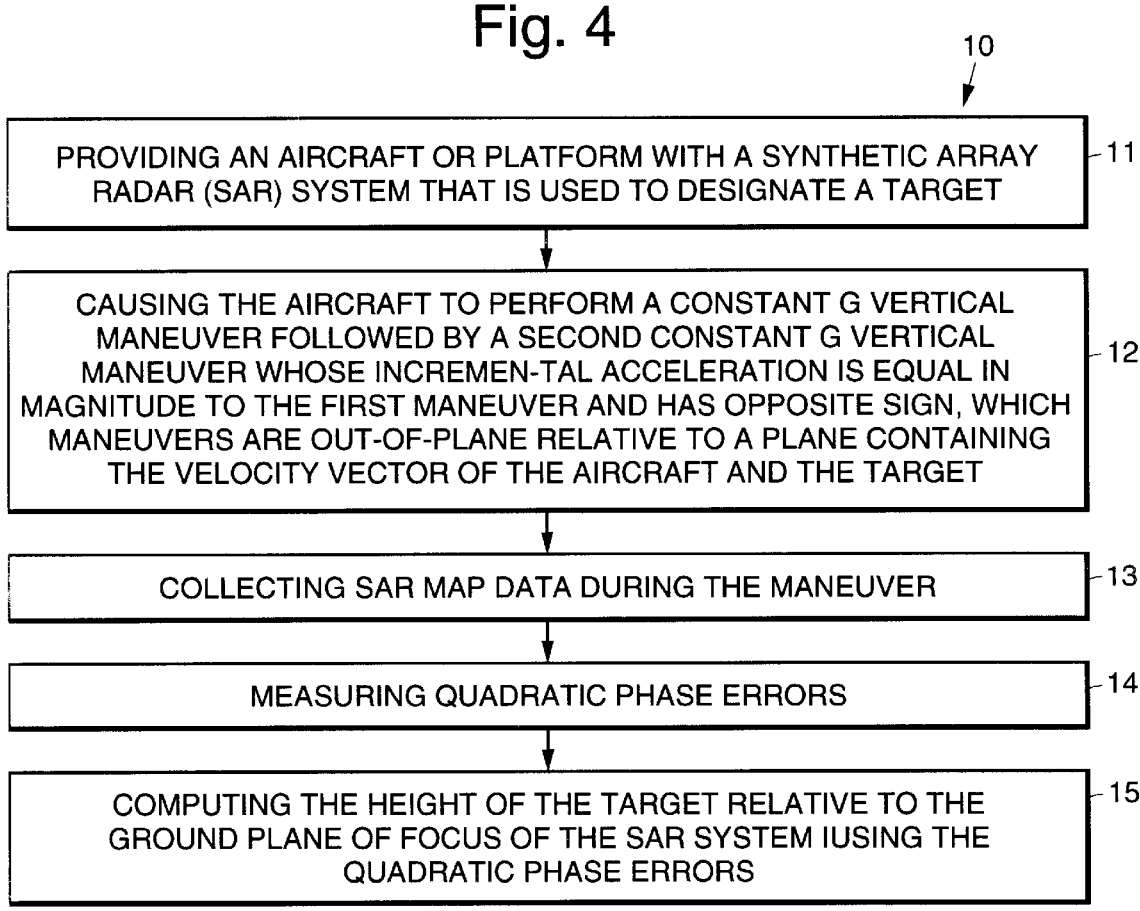
FIG. 4 is a flow chart depicting a dual acceleration height-of-focus height-above-target measurement algorithm in accordance with the principles of the present invention.

For purposes of completeness, and referring to FIG. 4, it is a flow chart that illustrates an embodiment of the present dual acceleration height-of-focus height-above-target measurement algorithm or method 10. The dual acceleration measurement method 10 comprises the following steps.

An aircraft 20 or platform 20 is provided 11 with a synthetic array radar (SAR) system 23 that is used to designate a target 21. The aircraft 20 is caused to perform 12 a constant g vertical maneuver followed by a second constant g vertical maneuver whose incremental acceleration is equal in magnitude to the first maneuver and has opposite sign. The respective maneuvers that are made are out-of-plane relative to a plane containing the velocity vector of the aircraft 20 and the target 21. These maneuvers correspond to a push-over maneuver followed by a pull-up maneuver. SAR map data is collected 13 during the maneuver that includes the designated target 21. Quadratic phase errors contained in the collected SAR map data are measured 14. The height of the target 21 relative to the ground plane of focus of the SAR system 23 is computed 15 using the quadratic phase errors.

The dual acceleration height-of-focus algorithm 10 provides a superior approach compared to the single acceleration approach. Improved accuracy height-above-target measurements are achieved for the GPS aided INS case. The dual acceleration measurements are made with a single eight second vertical S maneuver following target designation on a SAR map. This short duration and relatively mild (±0.5 g) incremental acceleration is tactically acceptable. Accurate height-above-target measurements are achieved at tactically significant ranges of tens of miles.

Thus, a dual acceleration height-of-focus algorithm or method for use in measuring height of an aircraft above a target has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for measuring the height of a platform above a target, said method comprising the steps of:

providing a platform with a synthetic array radar (SAR) system that is used to designate the target;

causing the platform to perform a first constant g vertical maneuver followed by a second constant g vertical maneuver whose incremental acceleration is equal in magnitude to the first maneuver and has opposite sign, which maneuvers are out-of-plane relative to a plane containing the velocity vector of the platform and the target;

collecting SAR map data during the maneuver that includes the designated target;

measuring quadratic phase errors contained in the collected SAR map data; and computing the height of the target relative to the ground plane of focus of the SAR system using the measured quadratic phase errors.

2. The method of claim 1 wherein the platform first flies a straight and level flight path, then flies the first constant g vertical maneuver immediately followed by the second constant g vertical maneuver, and ends by flying a straight and level flight path.

3. A method for measuring the height of an aircraft above a target, said method comprising the steps of:

providing an aircraft with a synthetic array radar (SAR) system that is used to designate the target;

causing the aircraft to perform a first constant g vertical maneuver followed by a second constant g vertical maneuver whose incremental acceleration is equal in magnitude to the first maneuver and has opposite sign, which maneuvers are out-of-plane relative to a plane containing the velocity vector of the aircraft and the target;

collecting SAR map data during the maneuver that includes the designated target;

measuring quadratic phase errors contained in the collected SAR map data; and computing the height of the target relative to the ground plane of focus of the SAR system using the measured quadratic phase errors.

4. The method of claim 3 wherein the aircraft first flies a straight and level flight path, then flies the first constant g vertical maneuver immediately followed by the second constant g vertical maneuver, and ends by flying a straight and level flight path.

\* \* \* \* \*